United States Patent [19]

Mclaughlin et al.

[11] Patent Number: 4,758,071

[45] Date of Patent: Jul. 19, 1988

[54] COLLIMATOR LENS

[75] Inventors: Paul O. Mclaughlin; Akitaka Momokita; Takashi Yamagishi, all of Doshomachi, Japan

[73] Assignee: Nippon Sheet Glass Co., Ltd., Osaka, Japan

[21] Appl. No.: 907,371

[22] Filed: Sep. 12, 1986

[30] Foreign Application Priority Data

Sep. 17, 1985 [JP] Japan ................................ 60-205101
Feb. 25, 1986 [JP] Japan ................................ 61-39662
May 9, 1986 [JP] Japan ................................ 61-106177
Jul. 7, 1986 [JP] Japan ................................ 61-159388

[51] Int. Cl.$^4$ ............................................. G02B 9/02
[52] U.S. Cl. .................................................. 350/413
[58] Field of Search ........................................ 350/413

[56] References Cited

U.S. PATENT DOCUMENTS 3,486,808 12/1969 Hamblen ............................ 350/413
3,873,408 3/1975 Hensler ............................ 350/413

*Primary Examiner*—John K. Corbin
*Assistant Examiner*—Rebecca D. Gass
*Attorney, Agent, or Firm*—Woodcock Washburn Kurtz Mackiewicz & Norris

[57] ABSTRACT

A collimator lens meets conditions that:
(i) at least the outgoing surface is spherical;
(ii) the lens comprises at least an index-varying region in which the refractive index varies in the axial direction but does not vary in the direction perpendicular to the axial direction, and a constant index region all over which the refractive index is fixed;
(iii) the point having the maximum refractive index $n_{oo}$ in the index-varying region is located at an apex of the profile of the lens;
(iv) when the refractive index $n(Z)$ on the optical axis at a distance $Z$ from the apex is represent by $n(Z)=n_{oo}+n_1Z+n_2Z^2$, $n_{oo}$ is within the range of 1.50 to 1.77, $n_1$ within the range of $-0.14$ to $-0.02$ mm$^{-1}$ and $n_2$ within the range of $-0.03$ to $+0.03$ mm$^{-2}$; and
(v) the inded-varying region is formed in the range of $Z=0$ to at least a depth d represented by an equation $$d=D^2/\{4R(1+\sqrt{1-(D/2R)^2})\}$$

where D is the aperture of the lens and R is the radius of curvature of the lens surface which includes the point having the maximum refractive index $n_{oo}$.

7 Claims, 8 Drawing Sheets

FIG.5
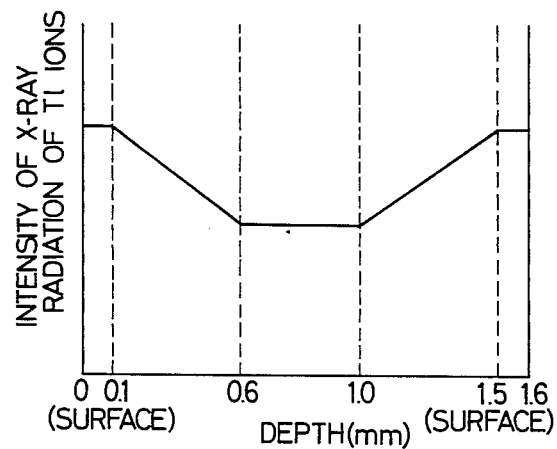
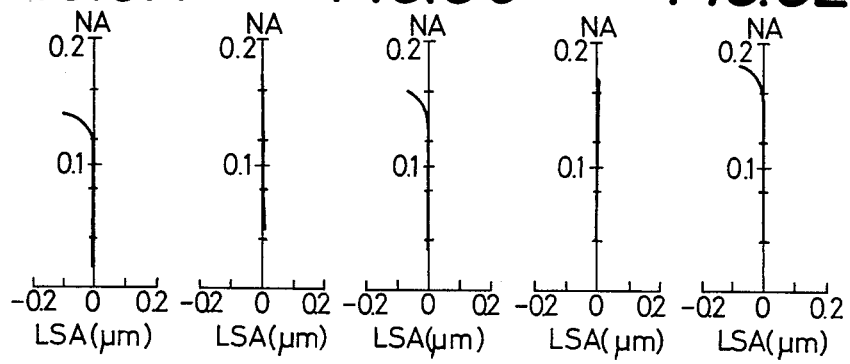
FIG.6A  FIG.6B  FIG.6C  FIG.6D  FIG.6E

COLLIMATOR LENS

BACKGROUND OF THE INVENTION

1. Field of the Invention:

This invention relates to a collimator lens which is useful to an optical system for reading from or writing in a recording medium.

2. Description of the Prior Art:

Recently, information processing using a high-density recording medium such as a compact disc, an optical disc or the like, has been rapidly advanced, in which an optical system is generally employed for reading from or writing in the recording medium.

In such an optical system, diffused light from a light source such as a semiconductor laser is converted to parallel rays by a collimator lens and then converged onto the surface of a recording medium by an objective lens. In addition to such an optical reading or writing system, a collimator lens has been generally and widely used for the purpose that diffused light is converted to parallel rays. When a collimator lens having reduced spherical aberration and coma is required, a compound lens consisting of plural spherical lenses has been used. In that case, however, it is hard to reduce the cost of the system.

In order to solve the above problem of such a compound lens system, system using an aspherical lens or a gradient index lens having refractive index gradient in the radial direction has been developed. Aspherical lenses are, however, unsuitable for mass-production because the aspherical surface is difficult to process or take an accurate measurement. On the other hand, a radial gradient index lens is made by an ion-exchange process of glass, however, the ion-exchange process has need of a long process time so that only a small lens having the effective aperture less than 5 mm can be obtained in practice.

SUMMARY OF THE INVENTION

Accordingly, it is an object of the present invention to provide a collimator lens which is suitable for an optical reading or writing system.

It is another object of the present invention to provide a collimator lens whose spherical aberration and coma can be reduced without remarkably increasing the cost.

It is still another object of the present invention to provide a method of making a collimator lens for an optical reading or writing system with facility for a relatively short time.

The above and other objects can be attained by the invention as follows. A collimator lens according to the invention meets conditions that:

(i) at least the outgoing surface is spherical;

(ii) the lens comprises at least an index-varying region in which the refractive index varies in the axial direction but does not vary in the direction perpendicular to the axial direction, and a constant index region all over which the refractive index is fixed;

(iii) the point having the maximum refractive index $n_{00}$ in the index-varying region is located at an apex of the profile of the lens;

(iv) when the refractive index $n(Z)$ on the optical axis at a distance Z from the apex is represented by $n(Z) = n_{00} + n_1 Z + n_2 Z^2$, $n_{00}$ is within the range of 1.50 to 1.77, $n_1$ within the range of $-0.14$ to $-0.02$ mm$^{-1}$ and $n_2$ within the range of $-0.03$ to $+0.03$ mm$^{-2}$; and (v) the index-varying region is formed in the range of $Z=0$ to at least a depth d represented by an equation $$d = D^2/\{4R(1+\sqrt{1-(D/2R)^2})\}$$

where D is the aperture of the lens and R is the radius of curvature of the lens surface which includes the point having the maximum refractive index $n_{00}$.

The above collimator lens can be made by the following method. An oxide glass plate containing at least a kind of monovalent cations is brought into contact with a molten salt containing monovalent cations which are to serve to increase the refractive index of the glass material, and the cations of the molten salt are diffused into the glass plate so that an index distribution decreasing gradually from the surface to the inside of the glass plate is established to a predetermined depth and the deeper part than that depth remains a fixed refractive index, and subsequently, at least the surface of the glass plate at the side of the index-varying region is processed to a spherical surface.

Other further objects of the invention will become obvious upon an understanding of the illustrative embodiments about to be described or will be indicated in the appended claims, and various advantages not referred to herein will occur to one skilled in the art upon employment of the invention in practice.

BRIEF DESCRIPTION OF DRAWINGS

FIG. 5 is a graph showing a concentration distribution of Tl ions in a glass plate according to a different embodiment from that of FIG. 3;

FIGS. 6A through 6E are aberration curves of lenses of examples 7 through 11 of the invention, respectively;

DETAILED DESCRIPTION OF THE PREFERRED EMBODIMENTS

Hereinafter, embodiments of the invention will be described in detail with reference to attached drawings.

Figure 1:
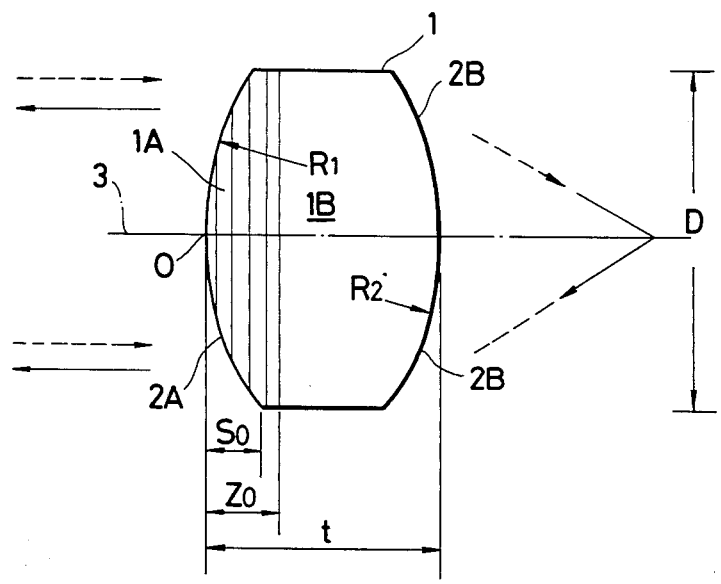
FIG. 1 is a sectional view of a collimator lens according to an embodiment of the invention.

Referring first to FIG. 1, a collimator lens 1 has a first refracting surface 2A which is formed into a spherical surface having the radius of curvature $R_1$. The refractive index $n(Z)$ in the plane perpendicular to the optical axis 3 at a distance Z from the origin 0 which coincides with the central point of the spherical surface 2A, is represented by an equation $$n(Z) = n_{00} + n_1 Z + n_2 Z^2 \tag{1}$$

where $n_{00}$ is the refractive index at the origin 0, $n_1$ and $n_2$ are constants, and all of them are values in relation to the wavelength of a light source such as a semiconductor laser used in an optical system.

An index-varying region 1A having the above index distribution is formed in the thickness range of the origin 0 to a depth $Z_0$. The refractive index is maximum at the origin 0 and decreases gradually as the distance Z increases. The values of $n_{00}$, $n_1$ and $n_2$ fall within the ranges of 1.50 to 1.77, $-0.14$ to $-0.02$ mm$^{-1}$ and $-0.03$ to $0.03$ mm$^{-2}$, respectively. When the thickness of the lens is represented by t, the refractive index is fixed all over a region 1B in the thickness range of t minus $Z_0$. The radius of curvature $R_2$ of a refracting surface 2B at the side of the constant index region 1B is determined so as to correct coma. The radius $R_2$ depends on the refractive index of the constant index region 1B and has a value within one of the ranges of $1/R_2>0$, $1/R_2=0$ and $1/R_2<0$.

In the lens 1, the distance $S_0$ on the optical axis between the central point 0 of the spherical surface 2A and the point corresponding to the outerest periphery of the sperical surface 24 is called "sag". When the aperture of the lens is represented by D, the sag $S_0$ is given by an equation $$S_0 = D^2/\{4R_1(1+\sqrt{1-(D/2R_1)^2})\} \quad (2)$$

In this embodiment, the index gradient is established in the range of the central point 0 to the point distant from the central point 0 by a length $Z_0$ which is larger than the sag $S_0$.

Figure 2:
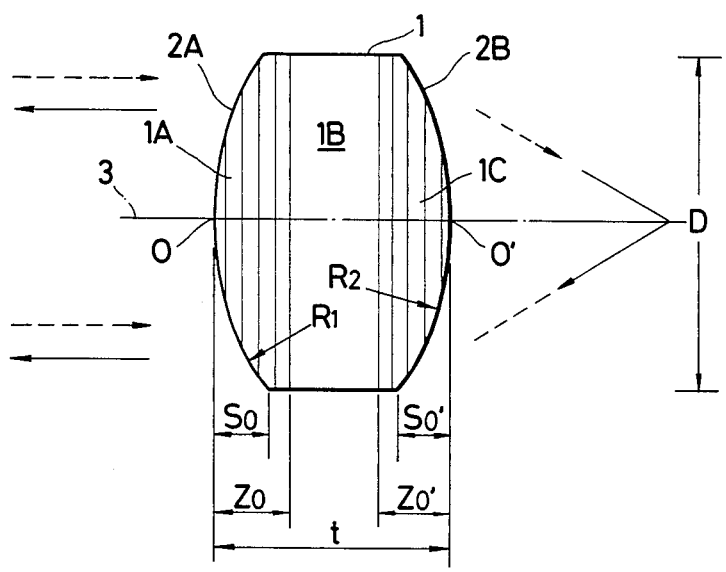
FIG. 2 is a sectional view of a collimator lens according to another embodiment of the invention.

FIG. 2 shows another embodiment of the invention, in which an index-varying region 1A having the same index gradient as that of the embodiment of FIG. 1 is formed in the range of the central point 0 of one refracting surface 2A to a depth $Z_0$, and another index-varying region 1C having index gradient represented by the above-mentioned equation (1) is formed in the range of the central point 0' of the other refracting surface 2B to a depth $Z_0'$. A constant index region 1B is intermediate between them. Also in the region 1C, the distance $Z_0'$ is larger than sag $S_0'$ given by an equation $$S_0' = D^2/\{4R_2(1+\sqrt{1-(D/2R_2)^2})\} \quad (3)$$

Figure 8:
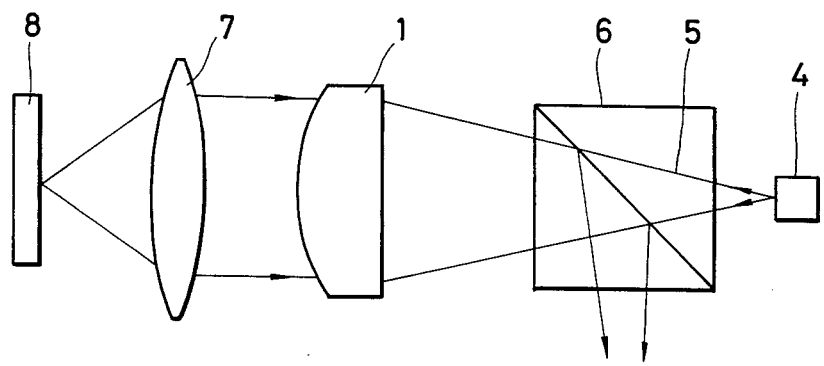
FIG. 8 is a side view of an optical reading system for an optical disc in which a collimator lens of the invention is used.

FIG. 8 shows an embodiment in which a collimator lens of the invention is used in an optical reading apparatus for an optical disc. Diffused light 5 emitted from a semiconductor laser 4 is introduced to a collimator lens 1 through a beam splitter 6. Parallel rays collimated by the collimator lens 1 are converged onto an optical disc 8 by an objective lens 7. Reflected light from the optical disc 8 is introduced through the objective lens 7, collimator lens 1 and beam splitter 6 to an optical detector (not shown). Alternatively, the beam splitter 6 may be disposed between the collimator lens 1 and the objective lens 7.

Next, a suitable method of making a collimator lens of the invention will be described with reference to FIGS. 9A through 9D.

Figure 9A:
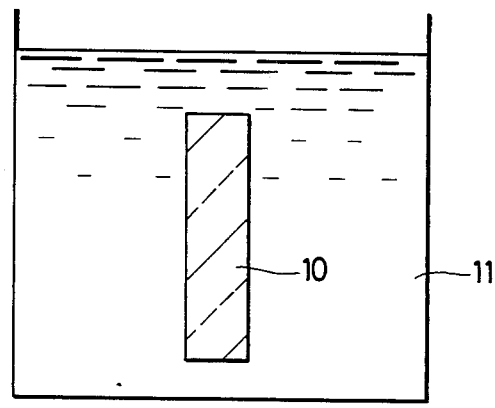
FIGS. 9A through 9D are views showing a process of making a collimator lens of the invention.

An oxide glass plate 10 containing at least a kind of monovalent cations is used as a base material, which is dipped in a molten salt 11 at a temperature near the transition temperature of the glass as shown in FIG. 9A. The molten salt contains monovalent cations to increase the refractive index of the glass material, for example, at least a kind of cations selected from the group of Li ions, Cs ions, Tl ions and Ag ions.

Figure 9B:
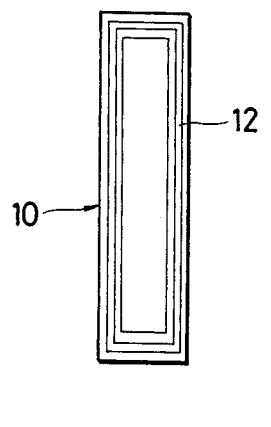

In the dipping process, the cations of the molten salt are diffused into the glass plate from both surfaces thereof by ion-exchanging with the cations of the glass plate. As the result, as shown in FIG. 9B, an index distribution 12 decreasing gradually and evenly from the surface to the inside of the glass plate 10 is established by an ion concentration distribution.

Figure 9C:
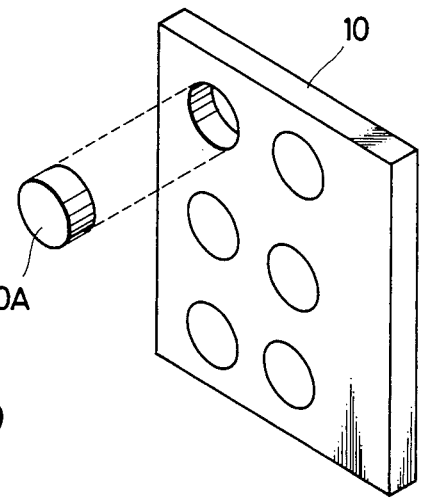
Figure 9D:
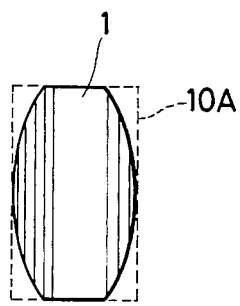

Subsequently, as shown in FIG. 9C, a large number of disk-like lens materials 10A are cut from the glass plate 10. One or each of both flat surfaces of each lens material 10A is processed into a spherical surface having a predetermined radius of curvature so that the lens thickness is adjusted into a predetermined value. In the case that a single lens is formed from a single glass plate, if the above-mentioned dipping process is effected without masking the edge portion of a glass plate, an index distribution layer is formed also in the edge portion. In that case, it is preferable that processing to form a spherical surface is effected after removing the index distribution layer of the edge portion because the processing becomes easy in view of the change of the hardness of the surface to be processed.

A glass plate subjected to the above-mentioned ion-exchange process must contain at least a kind of monovalent cations and have a high refractive index within the range of 1.50 to 1.77.

For making a glass having a high refractive index, oxide such as $TiO_2$, BaO, PbO and $La_2O_3$ is generally used as an additive for increasing the refractive index. Those kinds of additives, however, may cause a change in quality of glass in the process of ion exchange or may lower the rate of ion exchange. In contrast to them, $Tl_2O$ is preferable because it can increase the refractive index by 0.010 to 0.015 per mole % without the above problems.

Tl ions are most preferable as cations contained by a molten salt for an ion-exchange process of the invention. As a molten salt, nitrate, sulfate, halide, etc. can be used.

The ion-exchange process of the invention is preferably effected at a temperature as high as possible because the ion-exchange rate increases in general as the temperature rises. Too high temperature, however, causes a deformation of glass. For these reasons, a temperature near the transition temperature of the glass to be processed is used in practice. Generally, the dipping process is preferably effected at a temperature within the range of the transition temperature plus or minus 50° C.

Hereinafter, experimental results will be described.

EXAMPLE 1

A disk-shaped glass plate having the diameter of 8 mm and the thickness of 3.2 mm was dipped in a molten salt at a temperature of 505° C. for 444 hours. The composition of the glass plate is shown in the following table 1. The molten salt consisted of 10 mole % $Tl_2SO_4$, 30 mole % $K_2SO_4$ and 60 mole % $ZnSO_4$.

TABLE 1

| Composition (weight %) | | | | | | | Characteristics | |
|---|---|---|---|---|---|---|---|---|
| $SiO_2$ | $B_2O_3$ | ZnO | $Na_2O$ | $K_2O$ | $Tl_2O$ | $Sb_2O_3$ | Tg (°C.) | nd |
| 39.2 | 4.1 | 19.0 | 7.2 | 5.5 | 24.8 | 0.2 | 478 | 1.600 |

Tg: transition temperature

Figure 3:
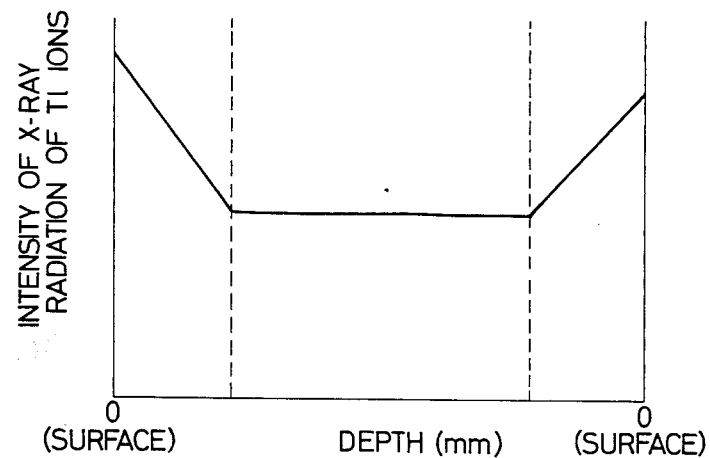
FIG. 3 is a graph showing a concentration distribution of Tl ions in a glass plate.

Tl ion concentration distribution in the thickness direction of the glass plate measured with an X-ray microanalyzer is shown in FIG. 3.

After grinding each flat surface of the glass plate by a thickness of 0.1 mm, the index distribution in the thickness direction was measured. The result showed an index distribution which evenly and equally descends from each flat surface to a depth of 0.8 mm. The refractive index at each flat surface was 1.641. The index distribution from each flat surface to the inside of the glass plate in the range of $0 \leq Z \leq 0.8$ mm was given by $n(Z) = 1.641 - 0.0514Z$.

The refractive index in the intermediate region between both index-varying regions in the thickness range of 1.4 mm was not changed by the ion-exchange process and had a constant value 1.600 which was the same as that of the original glass material.

Subsequently, both flat surfaces of the glass plate were ground to spherical surfaces having the radii of curvatures of $R_1 = 7.90$ mm and $R_2 = -249.8$ mm, respectively, so that the aperture of the lens was adjusted to 7.2 mm.

Figure 4A:
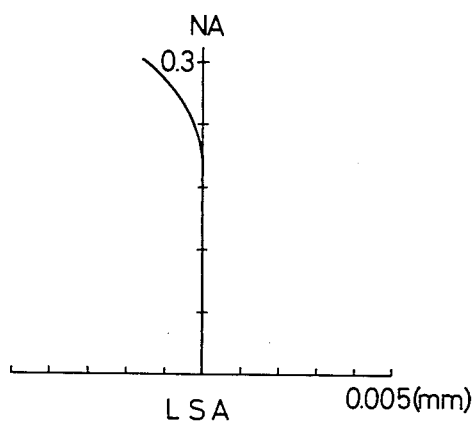
FIGS. 4A through 4F are aberration curves of lenses of examples 1 through 6 of the invention, respectively.
Figure 4B:
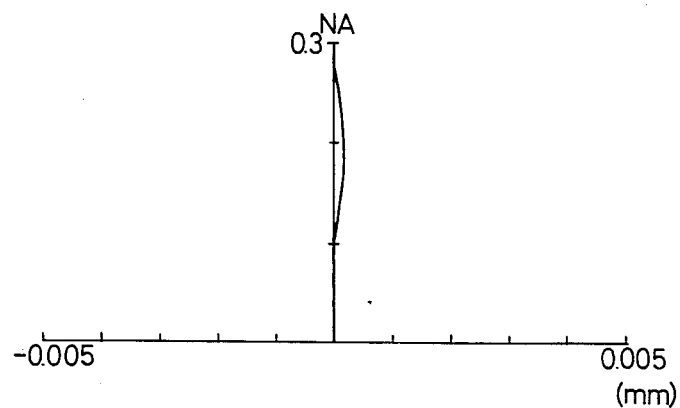
Figure 4C:
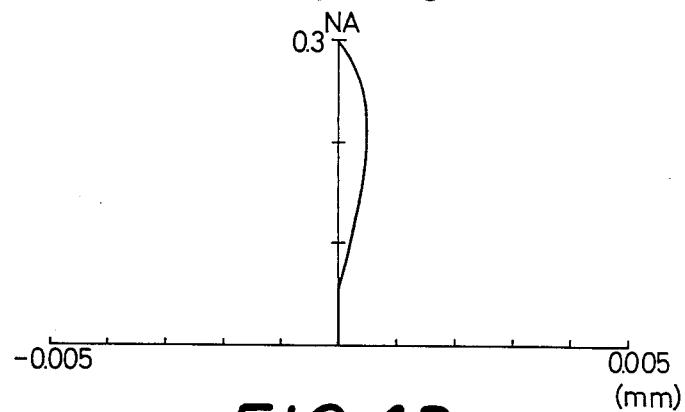
Figure 4D:
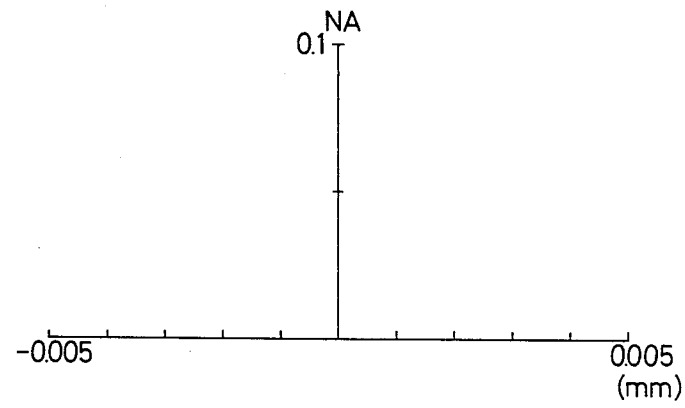
Figure 4E:
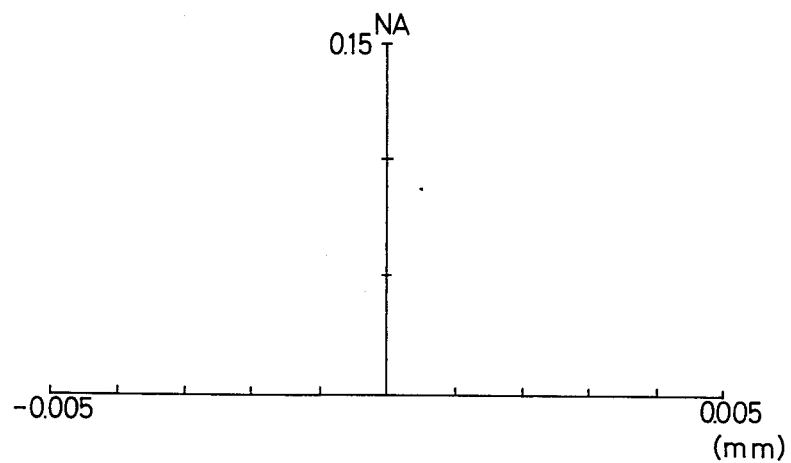
Figure 4F:
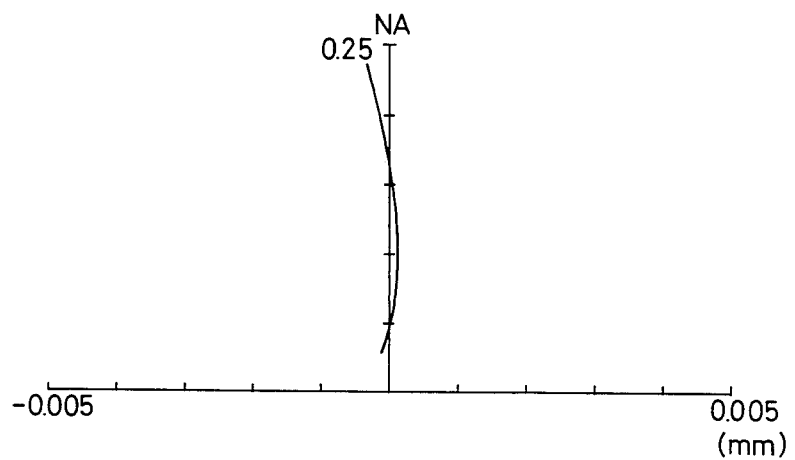

The focal length and numerical aperture (NA) were 12.0 mm and 0.3, respectively. A measurement result of spherical aberration (on the axis) of this optical system is shown in FIG. 4a. The maximum spherical aberration and coma of this system were 2 μm and less than 5 μm, respectively.

EXAMPLES 2 TO 6

Glass materials having different refractive indexes were provided. Each of them was subjected to an ion-exchange process fundamentally similar to that of Example 1. As the result, lens materials having various index distributions in the thickness directions were obtained. Each lens materal was then processed to form spherical surfaces. Index distributions mesured and conditions of lenses finally obtained are shown in the following tables 2A and 2B, respectively.

TABLE 2A

| Example | Distance Z (mm) on the axis | Index distribution |
|---|---|---|
| 2 | 0~0.4 | $n(Z) = 1.556 - 0.138Z - 0.00513Z^2$ |
|   | 0.4~2 | $n(Z) = 1.50$ |
| 3 | 0~0.4 | $n(Z) = 1.650 - 0.124Z$ |
|   | 0.4~1.6 | $n(Z) = 1.6$ |
|   | 1.6~2.0 | $n(Z) = 1.6 + 0.124(Z - 1.6)$ |
| 4 | 0~0.15 | $n(Z) = 1.608 - 0.0514Z$ |
|   | 0.15~2 | $n(Z) = 1.6$ |
| 5 | 0~0.4 | $n(Z) = 1.687 - 0.0297Z$ |
|   | 0.4~2 | $n(Z) = 1.675$ |
| 6 | 0~1 | $n(Z) = 1.631 - 0.0309Z$ |
|   | 0~3 | $n(z) = 1.6$ |

TABLE 2B

| Example | $R_1$ (mm) | $R_2$ (mm) | t (mm) | D (mm) | NA (mm) | Focal length (mm) |
|---|---|---|---|---|---|---|
| 2 | 3.23 | −13.76 | 2 | 3 | 0.3 | 5 |
| 3 | 3.42 | −50.85 | 2 | 3 | 0.3 | 5 |
| 4 | 7.56 | −181.40 | 2 | 2.4 | 0.1 | 12 |
| 5 | 13.19 | 303.66 | 2 | 6 | 0.15 | 20 |
| 6 | 12.82 | −694.13 | 3 | 10 | 0.25 | 20 |

Spherical aberrations of the lenses are shown in FIGS. 4B through 4F, respectively, and other characteristics are shown in the following table 3.

TABLE 3

| Example | Maximum spherical aberration (μm) | coma (μm) |
|---|---|---|
| 2 | 0.3 | 0.4 |
| 3 | 0.7 | 1.5 |
| 4 | 0.1 | 0.3 |
| 5 | 0.1 | 0.8 |
| 6 | 0.6 | 4 |

EXAMPLE 7

A disk-shaped glass plate having the diameter of 10 mm and the thickness of 1.6 mm was dipped in a molten salt at a temperature of 472° C. for 500 hours. The composition of the glass plate is shown in the following table 4. The molten salt consisted of 5 mole % $Tl_2SO_4$, 40 mole % $K_2SO_4$ and 55 mole % $ZnSO_4$. The transition temperature (Tg) of the glass was 490° C.

TABLE 4

| Composition (weight %) | | | | | | | Characteristics | |
|---|---|---|---|---|---|---|---|---|
| $SiO_2$ | $B_2O_3$ | ZnO | $ZrO_2$ | $Na_2O$ | $K_2O$ | $Tl_2O$ | Tg (°C.) | nd |
| 37.2 | 4.0 | 18.3 | 2.0 | 5.7 | 4.9 | 27.9 | 490 | 1.621 |

Tl ion concentration distribution in the thickness direction of the glass plate measured with an X-ray microanalyzer is shown in FIG. 5.

After grinding each flat surface of the glass plate by a thickness of 100 μm, the index distribution in the thickness direction was measured. The result showed an index distribution that the refractive index n(Z) on the optical axis at a distance Z from one flat surface was given by $n(Z) = 1.638 - 0.034Z$ in the range of $Z = 0$ to 500 μm, $n(Z) = 1.621$ (constant) in the range of $Z = 500$ to 900 μm and $n(Z) = 1.621 + 0.034Z$ in the range of $Z = 900$ to 1400 μm.

Subsequently, one flat surface of the glass plate was processed into a spherical surface having the radius of curvature $R_1 = 10.84$ mm and the aperture of the lens is adjusted to 4.76 mm. The focal length of the lens obtained, which had a spherical surface at one side and a flat surface at the other side, was 17.0 mm and the numerical aperture NA thereof was 0.14.

The lens was arranged so that parallel rays enter from the spherical surface into the lens. A beam splitter made of an optical glass BK7 and having the thickness of 5 mm was disposed in the rear of the lens. When the working distance WD is defined by (distance between the outgoing surface and the focal point) minus (thickness of the beam splitter), WD was 12.77 mm.

A measurement result of spherical aberration (axial aberration LSA) of this optical system is shown in FIG. 6A. The maximum hight of image was 0.6 mm and the third-order plus fifth-order coma was less than 4 μm.

EXAMPLES 8 TO 11

Glass materials having different refractive indexes were provided. Each of them was subjected to an ion-exchange process similar to that of Example 7. As the result, lens materials having various index distributions in the thickness directions were obtained. Then, lenses were made from the lens materials, respectively. Index distributions in the lenses measured and conditions of the lenses are shown in the following tables 5A and 5B, respectively. Each lens had a spherical surface having the radius of curvature R at the side of higher refractive index and a flat surface at the other side. In Example 8, a sufficiently thick glass plate was subjected to an ion-exchange process and then the surface portion was cut for a sampling lens from the glass plate. In Example 10, a glass plate having the thickness of 2 mm was subjected to an ion-exchange process for a long time so that both index-varying regions formed by ion-diffusing might intercross to each other.

TABLE 5A

| Example | Distance Z (mm) on the axis | Index distribution |
|---|---|---|
| 8 | 0~0.5 | $n(Z) = 1.68 - 0.0345Z$ |
|   | 0.5~1.5 | $n(Z) = 1.663$ |
| 9 | 0~0.5 | $n(Z) = 1.635 - 0.041Z + 0.040Z^2$ |
|   | 0.5~1.0 | $n(Z) = 1.624$ |
|   | 1.0~1.5 | $n(Z) = 1.624 + 0.021(Z - 1)$ |
| 10 | 0~1.0 | $n(Z) = 1.66 - 0.034Z$ |
|   | 1.0~2.0 | $n(Z) = 1.625 + 0.034(Z - 1)$ |
| 11 | 0~0.5 | $n(Z) = 1.627 - 0.041Z$ |
|   | 0.5~1.0 | $n(Z) = 1.606$ |
|   | 1.0~1.5 | $n(Z) = 1.601 + 0.041(Z - 1)$ |

TABLE 5B

| | Lens conditions | | | | |
|---|---|---|---|---|---|
| Example | R (mm) | t (mm) | D (mm) | NA (mm) | Fl (mm) |
| 8 | 11.56 | 1.5 | 4.76 | 0.14 | 17.0 |
| 9 | 10.80 | 1.5 | 5.5 | 0.16 | 17.0 |
| 10 | 11.88 | 2.0 | 5.4 | 0.15 | 18.0 |
| 11 | 9.40 | 1.5 | 5.7 | 0.19 | 15.0 |

Each lens obtained was evaluated with an optical system shown in the following table 6. Spherical aberrations of the lenses are shown in FIGS. 6B through 6E and other characteristics are shown in the table 6. In the table 6, "BS" represents a beam splitter made of BK7 glass and having the thickness of 5 mm.

TABLE 6

| Example | Optical system for measurement | Maximum height of image (mm) | Coma of 3rd plus 5th order |
|---|---|---|---|
| 8 | with BS WD = 12.79 mm | 0.6 | less than 2 μm |
| 9 | with BS WD = 12.81 mm | 0.6 | less than 10 μm |
| 10 | without BS WD = 16.78 mm | 0.6 | less than 1 μm |
| 11 | without BS WD = 14.07 mm | 0.6 | less than 7 μm |

EXAMPLE 12

A disk-shaped glass plate having the diameter of 16 mm and the thickness of 10.5 mm was dipped in a molten salt at a temperature of 525° C. for 45 days. The composition of the glass plate is shown in the following table 7. The molten salt consisted of 22 mole % TlNO₃ and 78 mole % KNO₃.

TABLE 7

| Composition (weight %) | | | | | | | | Characteristics | |
|---|---|---|---|---|---|---|---|---|---|
| $SiO_2$ | $B_2O_3$ | ZnO | $Na_2O$ | $K_2O$ | $Tl_2O$ | $Sb_2O_3$ | $Al_2O_3$ | Tg (°C.) | nd |
| 39.1 | 2.1 | 19.0 | 7.2 | 5.5 | 24.8 | 0.2 | 2.1 | 485 | 1.600 |

Tl ion concentration distribution in the thickness direction of the glass plate measured with an X-ray microanalyzer was the same as that of FIG. 3.

After grinding each flat surface of the glass plate by a thickness of 0.1 mm, the index distribution in the thickness direction was measured. The result showed an index distribution which evenly and equally descends from each flat surface to a depth of 2.1 mm. The refractive index at each flat surface was 1.724. The index distribution from each flat surface to the inside of the glass plate in the range of $0 \leq Z \leq 2.1$ mm was given by $n(Z) = 1.724 - 0.0600Z$.

The refractive index in the intermediate region between both index-varying regions in the thickness range of 6.1 mm was not changed by the ion-exchange process and had a constant value 1.600 which was the same as that of the original glass material.

Subsequently, the glass plate was cut and separated at the center of the thickness parallel with both flat surfaces so that two glass plates having the same index distribution were obtained. Then, the surface at the side of index-varying region of each glass plate was processed into a spherical surface having the radius of curvature $R_1 = 7.24$ mm and the other surface thereof remained flat. The thickness and aperture of each lens were adjusted to 4.5 mm and 10.0 mm, respectively. The focal length and numerical aperture (NA) of each lens obtained were 10.0 mm and 0.5, respectively.

Figure 7A:
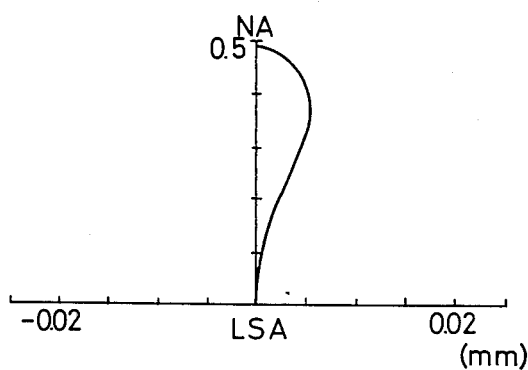
FIGS. 7A through 7D are aberration curves of lenses of examples 12 through 15 of the invention, respectively.

A measurement result of spherical aberration (axial aberration) of this optical system is shown in FIG. 7A. The maximum spherical aberration and coma of this system were 4 μm and less than 15 μm, respectively.

EXAMPLES 13 to 15

Glass materials having different refractive indexes were provided. Each of them was subjected to an ion-exchange process fundamentally similar to that of Example 12. As a result, lens materials having various index distributions in the thickness directions were obtained. In Examples 13 and 14, each disk-shaped glass plate after an ion-exchange process was cut at the center of the thickness similarly to that of Example 12, subsequently, the surface at the side of the index-varying region was processed into a spherical surface and the surface at the side of the constant index region was polished to remain a flat surface. In Example 15, both surfaces of a disk-shaped glass plate after an ion-exchange process were processed into spherical surfaces.

Index distributions in the lenses measured and conditions of the lenses are shown in the following tables 8A and 8B. In the table 8A, Z represents the distance from the origin which is the intersecting point between the outgoing surface and the optical axis, toward the inside of the lens.

TABLE 8A

| Example | Z (mm) | Index distribution |
|---|---|---|
| 13 | 0~1.6 | $n(Z) = 1.765 - 0.0573Z$ |
|   | 1.6~5.1 | $n(Z) = 1.675$ |
| 14 | 0~0.6 | $n(Z) = 1.583 - 0.135Z - 0.00554Z^2$ |
|   | 0.6~2.2 | $n(Z) = 1.5$ |
| 15 | 0-2.7 | $n(Z) = 1.684 - 0.0314Z$ |
|   | 2.7~9.2 | $n(Z) = 1.6$ |
|   | 9.2~11.9 | $n(Z) = 1.6 + 0.0314(Z - 9.2)$ |

TABLE 8B

| Example | R₁ (mm) | R₂ (mm) | t (mm) | D (mm) | NA (mm) | Fl (mm) |
|---|---|---|---|---|---|---|
| 13 | 7.42 | 149.8 | 5.1 | 9 | 0.45 | 10 |
| 14 | 3.33 | −14.92 | 2.2 | 3.5 | 0.35 | 5 |
| 15 | 14.6 | −137.0 | 11.9 | 16 | 0.4 | 20 |

Figure 7B:
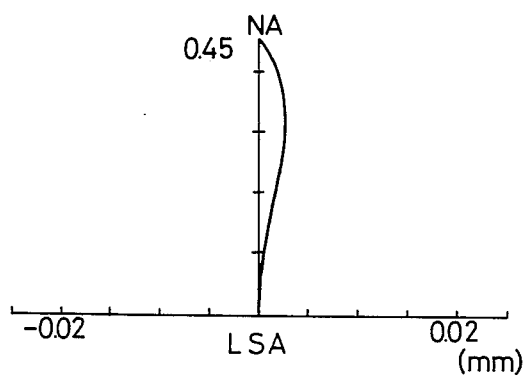
Figure 7C:
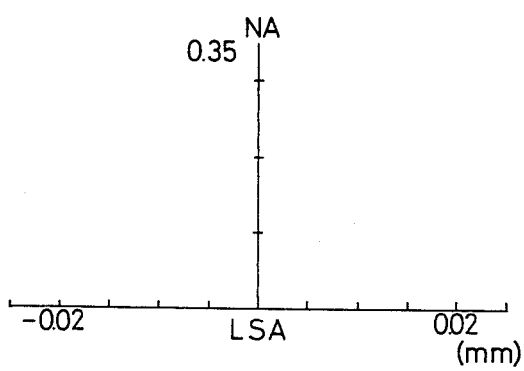
Figure 7D:
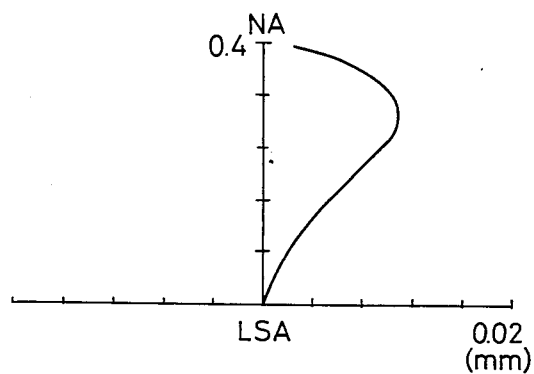

Spherical aberrations of the lenses obtained are shown in FIGS. 7B through 7D, respectively, and other characteristics are shown in the following table 9.

TABLE 9

| Example | Maximum spherical aberration (μm) | coma (μm) |
|---|---|---|
| 13 | 2 | 8 |
| 14 | 1 | 1 |
| 15 | 10 | 10 |

According to the invention, a lens material can be obtained by such a simple manner that a glass plate is subjected to an ion-exchange process in a molten salt, so that, a highly efficient collimator lens with low spherical aberration and coma can be obtained by the manner that the lens material is only processed to have a spherical surface or surfaces.

What is claimed is:

1. A collimator lens which meets conditions that:
 (i) at least the outgoing surface if spherical;
 (ii) said lens comprises at least an index-varying region in which the refractive index varies in the axial direction but does not vary in the direction perpendicular to the axial direction, and a constant index region all over which the refractive index is fixed;
 (iii) the point having the maximum refractive index $n_{00}$ in said index-varying region is located at an apex of the profile of said lens;
 (iv) when the refractive index $n(Z)$ on the optical axis at a distance Z from said apex is represented by $n(Z) = n_{00} + n_1 Z + n_2 Z^2$, $n_{00}$ is within the range of 1.50 to 1.77, $n_1$ within the range of −0.14 to −0.02 mm$^{-1}$ and $n_2$ within the range of −0.03 to +0.03 mm$^{-2}$; and
 (v) said index-varying region is formed in the range of $Z=0$ to at least a depth d represented by an equation $$d = D^2 / \{4R(1+\sqrt{1-(D/2R)^2})\}$$

where D is the aperture of said lens and R is the radius of curvature of the lens surface which includes said point having the maximum refractive index $n_{00}$.

2. A collimator lens according to claim 1, wherein the focal length and numerical aperture of said lens are 5 to 20 mm and 0.35 to 0.5, respectively.

3. A collimator lens according to claim 1, wherein the focal length and numerical aperture of said lens are 5 to 20 mm and 0.1 to 0.35, respectively.

4. A collimator lens according to claim 1, wherein $n_{00} = 1.63$ to 1.70 and $n_1 = -0.025$ to $-0.050$ mm$^{-1}$, respectively.

5. A collimator lens according to claim 4, wherein the focal length and numerical aperture of said lens are 15 to 20 mm and 0.1 to 0.2, respectively.

6. A collimator lens according to claim 1, wherein said index-varying region is formed at the side of one of the incident surface and outgoing surface of said lens.

7. A collimator lens according to claim 1, wherein a pair of said index-varying regions are formed at both sides of the incident surface and outgoing surface of said lens and a constant index region is formed intermediately between said index-varying regions.

* * * * *

UNITED STATES PATENT AND TRADEMARK OFFICE
CERTIFICATE OF CORRECTION

PATENT NO. : 4,758,071

DATED : July 19, 1988

INVENTOR(S) : Paul O. McLaughlin; Akitaka Momokita, Takashi Yamagishi

It is certified that error appears in the above-identified patent and that said Letters Patent is hereby corrected as shown below:

Abstract, line 17, change "inded" to --index--.

Col. 9, Line 33, change "if" to --is--.

Signed and Sealed this

Fourteenth Day of March, 1989

*Attest:*

DONALD J. QUIGG

*Attesting Officer*  *Commissioner of Patents and Trademarks*